Figure 1:
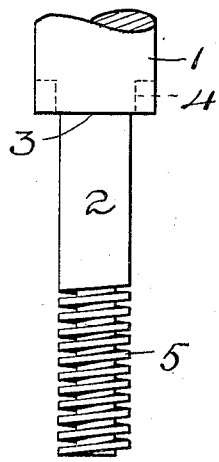

A. KOCHER.
REAMER.
APPLICATION FILED MAR. 17, 1913.

1,083,747.

Patented Jan. 6, 1914.

WITNESSES
Samuel Payne
Karl H. Butler

INVENTOR
A. Kocher.
By Henry C. Evert.
ATTORNEY

COLUMBIA PLANOGRAPH CO., WASHINGTON, D. C.

UNITED STATES PATENT OFFICE.

ALBERT KOCHER, OF EAST PITTSBURGH, PENNSYLVANIA.

REAMER.

1,083,747.

Specification of Letters Patent.

Patented Jan. 6, 1914.

Application filed March 17, 1913. Serial No. 754,804.

*To all whom it may concern:*

Be it known that I, ALBERT KOCHER, a subject of the Emperor of Germany, residing at East Pittsburgh, in the county of Allegheny and State of Pennsylvania, have invented certain new and useful Improvements in Reamers, of which the following is a specification, reference being had therein to the accompanying drawing.

This invention relates to reamers, and the object of my invention is the provision of positive and reliable means, as hereinafter set forth, for locking a reamer bit relatively to a spindle, whereby the liability of the reamer becoming displaced when in operation is reduced to a minimum.

I accomplish the above objects by a tool that has a locking washer for holding a reamer upon a spindle and the construction of the locking washer is such that it can be easily and quickly placed in position, manufactured at a comparatively small cost and used without interfering with the operation of the reamer.

The invention will be hereinafter specifically described and then claimed and reference will now be had to the drawing, wherein:—

Figure 4:
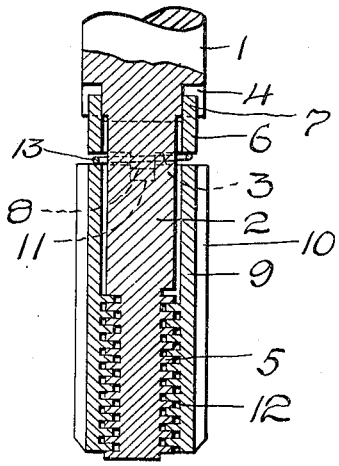
Figure 2:
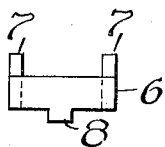
Figure 3:
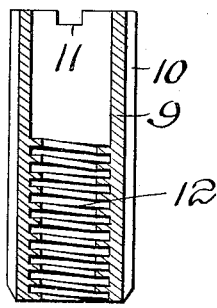
Figure 5:
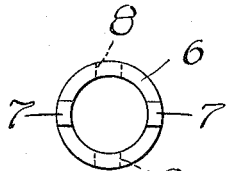

Figure 1 is a side elevation of a reamer spindle, Fig. 2 is an elevation of a locking washer, Fig. 3 is a longitudinal sectional view of the reamer body, Fig. 4 is a longitudinal sectional view of the assembled elements shown in Figs. 1 to 3 inclusive, and Fig. 5 is a plan of a locking washer.

Further describing my invention in detail with reference to the accompanying drawing wherein like numerals denote corresponding parts throughout: 1 denotes a drill shaft having the end thereof reduced to provide a spindle 2 and an annular shoulder 3. The shoulder 3 is provided with diametrically opposed sockets 4 and the end of the spindle 2 is screw threaded, as at 5.

6 denotes a washer that has one side thereof provided with diametrically opposed lugs 7 adapted to engage in the sockets 4, and the opposite side of the washer 6 has diametrically opposed lugs 8, said lugs having a position at substantially a right angle to the position of the lugs 7, whereby any stresses or strains upon the washer will be equally distributed.

9 denotes a tubular reamer body having cutting edges 10. The inner end of the body has sockets 11 to receive the lugs 8 of the washer 6 and the outer end of the reamer body is interiorly screw threaded, as at 12 to receive the threaded spindle 2.

After the washer 6 has been placed upon the spindle 2 with the lugs extending into the sockets 4, a coiled spring 13 is placed upon the spindle against the washer 6, said spring having preferably one convolution. The reamer body 9 is then screwed upon the spindle 2 in proximity to the washer 6. The reamer body is positioned whereby the sockets 11 will aline with the lugs 8 and then the washer is shifted until the lugs 8 engage in the sockets 11. The reamer body 9 and the washer 6 are then revolved a half revolution of the spindle whereby the lugs will again register with the sockets. The washer 6 is again shifted to place the lugs 7 in the sockets 4 thereby moving the lugs 8 out of the sockets 11. The reamer body can then be rotated a half of a revolution and this operation can be continued until the reamer body has reached such a point as to be locked in the manner shown in Fig. 4. The coiled spring 13 coöperates with the locking washer in maintaining the lugs 7 and 8 in the sockets 4 and 11 respectively. The reamer body cannot become accidentally displaced and cannot be removed except by manually reversing the operation set forth above.

One embodiment of my invention has been illustrated but it is to be understood that the structural elements are susceptible to such variations and modifications as fall within the scope of the appended claim.

What I claim is:—

In a reamer, a drill shaft having the end thereof reduced to provide an annular shoulder having diametrically opposed sockets formed therein, the reduced end of said shaft having the end thereof screw threaded, a washer arranged upon said spindle and having the edges thereof provided with oppositely disposed lugs, the lugs upon one face of the washer being positioned intermediate the lugs upon the other face of the washer, a tubular reamer body interiorly screw threaded and adapted to be screwed upon said spindle, the inner end of said reamer 5 body having diametrically opposed sockets formed therein to receive the lugs on one edge of said washer, and a coiled spring interposed between said washer and the inner end of said reamer body to maintain the lugs of said washer in the socket of said drill 10 shaft.

In testimony whereof I affix my signature in the presence of two witnesses.

ALBERT KOCHER.

Witnesses:
 MAX H. SROLOVITZ,
 KATHERINE ERRETT.

Copies of this patent may be obtained for five cents each, by addressing the "Commissioner of Patents, Washington, D. C."